United States Patent Office

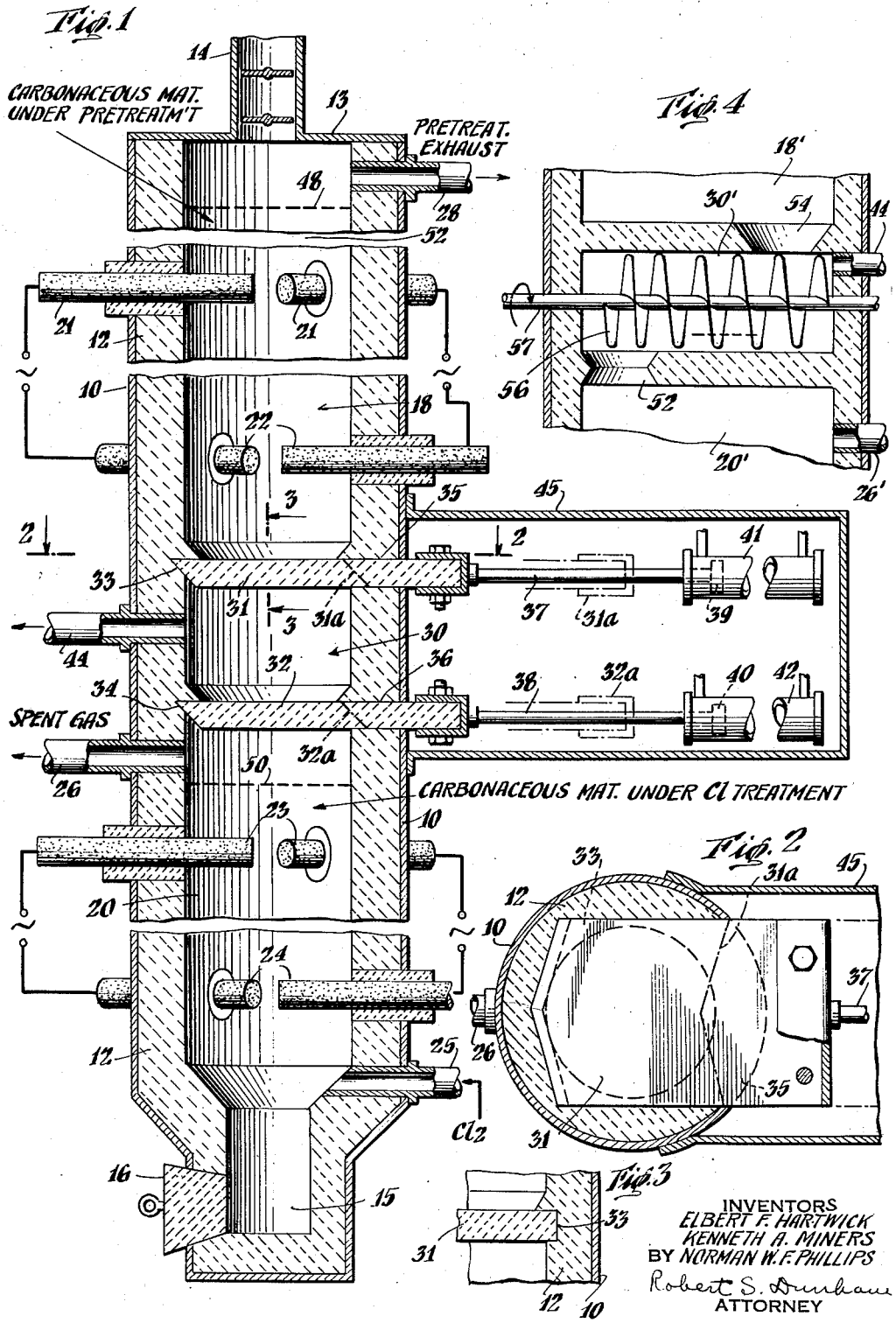

2,698,777
Patented Jan. 4, 1955

2,698,777

PROCEDURE FOR TREATING SOLID MATERIAL WITH GAS AT HIGH TEMPERATURE

Elbert F. Hartwick, Kenneth A. Miners, and Norman W. F. Phillips, Arvida, Quebec, Canada, assignors to Aluminium Laboratories Limited, Montreal, Quebec, Canada, a corporation of Canada Application January 26, 1951, Serial No. 207,984

9 Claims. (Cl. 23—209.9)

This invention relates to methods for treating carbonaceous material such as coal and coke, with chlorine, and is particularly directed to improvements in the efficiency and continuity of operation of such treatments for purifying carbonaceous material of coal origin, for example so that coke or anthracite coal, as normally received from suppliers, can be treated by apparatus and procedure of unitary character to yield a highly pure product.

An effective mode of purifying carbonaceous materials of the character described comprises treatment with chlorine gas at an elevated temperature. With such chlorination the ash content of the material is greatly reduced, chiefly by conversion of metallic impurities into volatile chlorides which are readily swept away from the treatment zone. A particularly efficient method of so chlorinating coke and anthracite coal, which involves keeping the main body of material at 1400° C. or higher, is described and claimed in the copending application of Norman W. F. Phillips, Ethan A. Hollingshead and James S. Mutchmor, Serial No. 185,947, filed September 21, 1950, now U. S. Letters Patent No. 2,657,118, issued October 27, 1953.

In general, such operations may be carried out in a continuous or semi-continuous manner in a suitable furnace, usually a vertical shaft furnace lined with refractory material. The furnace is first filled with the carbonaceous material in appropriate granular or other divided form, e. g. usually coarse granules. The charge is heated in any convenient way, for example by passage of electric current through it between electrodes set through the walls of the furnace, preferably in vertically spaced positions. Chlorine is introduced at or near the bottom and rises through the hot carbon, reacting to form volatile chlorides of metallic impurities which along with carbon oxides formed in the reaction and any residual chlorine, pass to an outlet at or near the top of the furnace. The flow of chlorine may advantageously be continuous; the purified carbon is continuously or periodically removed from the bottom of the furnace, while impure carbon, i. e. further coke or anthracite coal, is introduced at the top.

In general, procedure of the character described affords satisfactory results, especially with respect to the high purity of the carbon produced; but some aspects of the procedure have evidenced a need for still further improvement, for the sake of efficiency, and in some cases, to prevent certain objectionable effects which interfere with continuity of operation. In the first place it has been found that during most operations of such a furnace in accordance with the process described above, i. e. with either type of material, of which coke may therefore be taken as example, the consumption of chlorine is extraordinarily high. It will be understood that the amount of chlorine needed to form chlorides of the impurities in the coke (or anthracite) can be calculated with fair accuracy, as likewise the quantity of chlorine lost in reaction with the refractory walls of the furnace, while the unconsumed chlorine, if any, which passes completely through and out of the furnace (i. e. without reaction) can be determined by analysis of the exit gases. Upon such calculation and determination of the theoretical chlorine consumption, and upon comparison of the latter with the actual amount (by measurement) of chlorine gas supplied, it was found, however, that in most cases these determinations failed to account for a relatively large quantity or proportion of the supplied chlorine.

For instance in one set of operations using a refractory-lined, vertical shaft furnace wherein the charge was electrically heated and the process performed as described above, it was found that a highly satisfactory carbon product could be obtained at a rate of from 3 to 4 tons per day (of 24 hours), the coke being fed intermittently in batches at the top of the furnace and the carbon being removed from the bottom. With the original coke having a total ash content of 9% to 10%, the desirably pure product had a total ash of 2% or less, with iron and silicon each less than 0.2% and titanium 0.05% or less. The furnace had a heated or reaction zone capacity of about 2.8 tons. While the stoichiometric chlorine requirement for the grade of coke used was about 0.2 pound of chlorine per pound of product (i. e. to account for the chloridizable impurities as removed) and while consumption of chlorine by reaction with the refractory brick lining (chiefly aluminum silicate or silicates) was found to be about 0.1 pound of chlorine per pound of product, it was necessary to pass approximately 0.4 pounds of chlorine through the furnace, per pound of purified carbon produced in order to obtain the desired results. Since analysis of the exit gases showed little or no free chlorine (the chlorine feed being adjusted, for the most part, so as to provide a slight trace of chlorine in such gas, for insurance of maximum reaction), it will be seen that the actual consumption of chlorine was about 33% or so more than that which was theoretically necessary for reaction together with that lost in attack on the lining. Indeed the furnace used was of a rather small size, having an internal diameter of about 3 feet; with a larger furnace, e. g. up to 12 feet in diameter or more, the proportion of chlorine consumed by attack on the refractory lining would be much less, increasing the actual chlorine consumption to about 50% more than that theoretically necessary for the purification treatment.

Accordingly an important object of the present invention is to reduce or obviate the relatively large consumption of chlorine thus found to occur in the treatment of carbonaceous material, a more specific object being to provide improved procedure and apparatus whereby the chlorine consumption may be kept at least reasonably close to the quantity theoretically required for the purifying reactions. Although in situations where chlorine is very inexpensive improvement in these respects may be of minor value, such is not ordinarily the case; indeed in general, the cost of chlorine is a major item of expense in the described procedure, so that a substantial reduction of chlorine consumption, and indeed any appreciable reduction in that respect, constitutes a worthwhile saving.

Where anthracite coal has been employed as a raw material for production of purified carbon with furnaces of the type described above, a further and more serious difficulty has also been encountered. In general, the procedure of treating anthracite is essentially the same as in the case of coke, except that by reason of the naturally poor electrical conductivity of anthracite coal, it should be subjected to a preliminary heating or calcining treatment before it reaches the electrical heating zone, such preliminary treatment being effected for a sufficient time and at a high enough temperature to reduce greatly the normally high electrical resistance. A particularly convenient way of achieving such pretreatment has been to maintain a rather tall bed or body of the anthracite above the electrode zone in the furnace, so that the material is sufficiently preheated, both by direct transfer and especially by the heat of the exit gases, before it drops to the region where heating by electrical conduction is to take place. At least in the part, the described initial heating of the anthracite effectuates the improvement in electrical conductivity by driving off volatile substances, largely hydrogen and hydrocarbons. In operations of this character it was found, however, that the furnace tended to clog quite badly, particularly in the uppermost region where the anthracite was subjected to the described initial calcination, the result being both to prevent downward passage of the solid material and to cut off the desired flow of gas.

Investigation has revealed that the described difficulty in the treatment of anthracite coal is occasioned by the strong reducing action of the volatile components, which are driven off in the upper part of the furnace shaft and which there mix with the ascending carbon oxides, chlorides and residual chlorine, all normally intended to be expelled from the furnace (at its top) together. That is to say, it appears that the hydrogen or hydrocarbons or most likely both, which may be herein conveniently classified as active hydrogen material, react to reduce the ferric chloride contained in the gases ascending from the heated or principal reaction zone, thereby producing ferrous cholride. Since the ferrous chloride is relatively non-volatile, e. g. at the temperatures in the upper part of the furnace (say 1000° C. or so), it tends to precipitate in the interstices of the granular mass of coal, thereby cementing the latter or parts of it together so as to form hard, dense bodies, layers or the like. These agglomerated and relatively impermeable dams or bridges effectively prevent either the continued descent of granular carbon material or the continued ascent of the reaction gases, or both. When conditions of this sort arise after a certain period of operation, indeed after even a short period, the procedure is in effect completely interrupted, the only remedy being to shut down the furnace and dig out the hard, packed mass at or near the top of the contained column.

While it is theoretically possible to increase the amount of supplied chlorine gas to such a large extent that the reduction of $FeCl_3$ to $FeCl_2$ is prevented, such type of operation is not feasible in practice, especially for economic reasons. It is therefore a very important object of the present invention to provide improved methods and apparatus which minimize, and indeed avoid the described difficulties, permitting the desired continuous or semi-continuous operation over long periods of time without costly interruption.

A further object of the invention is the provision of novel procedure and structures whereby either coke or anthracite coal may be directly treated in the form in which such material is normally received from suppliers, such treatment being preferably of a simple, unitary character, which proceeds in a smooth and uninterrupted manner over long periods of time and with high efficiency, i. e. a relatively low consumption of chlorine.

To these and other ends, presently preferred features of the invention embrace the provision of successive heating treatments of the carbonaceous material, most advantageously by sequential operation in separated regions, the chlorination being effected only in the second stage, and the arrangement being such that the heated material from the first stage is directly transferred to the second with little or essentially no loss of heat. More specifically, the apparatus of the present invention embraces a furnace having two operating chambers, each of which has suitable gas outlet means, the two chambers being interconnected by means affording direct passage of the solid carbonaceous material from the first to the second while at least substantially avoiding any commingling of the gases produced in the respective zones. Thus such a furnace may involve the described, successive chambers, arranged in suitable alignment and separated by an intermediate transfer chamber or other gating means, of such character that successive quantities of the carbonaceous material can be moved from the first to the second chamber without appreciable or large flow of gas in either direction between the chambers. Means for admitting chlorine are provided in the second chamber, where the chlorination treatment is effected, each of the chambers preferably having its own heating means, of the type whereby electric current is passed through the charge. Although other specific structures or dispositions of the furnace chambers may be employed in some cases, an especially advantageous arrangement is a tall shaft furnace, wherein the successive chambers are arranged in vertical array, the coke or coal thus passing downward through the first or preliminary heating chamber, then the transfer means, and finally through the chlorination chamber, purified carbon being withdrawn from the foot of the latter.

By such procedure, wherein the carbonaceous material is heated in the first zone, e. g. to a temperature of usually at least about 1000° C. and preferably, at least for the most part, to a temperature of 1100° C. to 1400° C., the active hydrogen content is preliminarily eliminated to an effective or useful extent. Thereupon successive portions of the material are advanced to the second chamber, but without commingling of the gases from either, and the chlorination is performed, with the desired result of removing inorganic contamination, including particularly compounds of iron, silicon, titanium and other metals. The transfer from the first to the second zone being preferably effected without much loss of heat in the coke or coal, the corresponding electrical current requirement in the second zone is greatly reduced, thereby affording good efficiency for the entire operation, from the standpoint of power requirement. At the same time, the preliminary treatment is found to obviate very effectively the several difficulties described above. In the case of coke, and indeed all of the described carbonaceous materials, it has been found that the otherwise unaccountable loss of chlorine was occasioned by reaction with hydrogen, hydrocarbons or the like (herein designated as active hydrogen material) with chlorine, yielding corresponding hydrogen chloride and chlorine compounds in the exit gases. By the presently improved procedure, the reactive hydrogen content of the carbonaceous material is greatly reduced in the first chamber, such hydrogen material being there carried off in volatile, i. e. gaseous, form. In consequence there is much less, and indeed little or no wasteful reaction with chlorine in the second chamber. In the case of anthracite coal, the specific improvement is very great, in that there is essentially no opportunity for the ferric chloride (which results from the chlorine treatment of combined iron in the coal) to be reduced by active hydrogen materials; on the one hand, such materials have been largely removed in the pretreatment, and on the other hand, there need be little or no upper bed of anthracite, i. e. above the actual heated zone, in the chlorination chamber. Hence the operation will proceed smoothly, without bridging or other clogging of the apparatus. It will be understood that in the case of anthracite, the upper chamber may provide for a sufficient depth of the coal to reduce its electrical resistance before it reaches the electrical heating region of the upper chamber; but since there is essentially no chlorine in this chamber, there is no danger of precipitating ferrous chloride in the mass of solid material. Furthermore, in operation with any of the described materials, the pretreatment is of corollary advantage in reducing the moisture content of the solids to a desirably low value, e. g. less than 0.5%, a requirement for which a preliminary drying step has heretofore often been necessary.

While in some cases a method of the character described may be practiced by entirely separate stages of heating, between which the carbon material is suitably cooled for intermediate storage and handling at room temperature, the combined operation as described above is of unusual advantage and is therefore greatly preferred. Not only is there substantial economy, both in quantity of heat required and in various handling and like operations, but the entire process may be of a simple or unitary type, affording essentially continuous (or correspondingly semi-continuous) flow of the carbonaceous material from its introduction in the raw state to its delivery as highly pure carbon, e. g. suitable for manufacture of carbon electrodes (as used in the electrolytic reduction of aluminum) or for a variety of other purposes.

While as indicated, the apparatus may assume any of a variety of forms, including furnaces of various specific shapes and sizes, the accompanying drawings illustrate, in a somewhat diagrammatic manner, certain examples of structures which may be usefully employed.

Referring to the drawings:

Fig. 1 is a central vertical section, showing, in simplified form, a furnace embodying the invention;

Fig. 2 is a horizontal section on line 2—2 of Fig. 1;

Fig. 3 is a fragmentary vertical section on line 3—3 of Fig. 1; and

Fig. 4 is a fragmentary vertical section, showing another arrangement at the central part of a structure such as illustrated in Fig. 1.

The embodiment of Figs. 1 to 3 is a vertical shaft furnace having an outer shell or casing 10 of steel or the like, internally lined with a thick layer or wall of refractory material 12, e. g. dense, high quality fire clay or like refractory (in brick, tile or other form), usually or preponderantly having a composition of aluminum silicate or silicates. The entire structure may be conveniently cylindrical, providing an internally cylindrical region, closed at the top by a cover 13 with an appropriately valved or gated inlet 14 whereby successive portions of coke or coal may be introduced. At the bottom, the furnace has a discharge chamber 15, with a removable door 16 of refractory material, or like means, to permit withdrawal of quantities of purified carbon from time to time. The entire arrangement of the steel shell 10, cover 13 and associated parts is preferably designed to afford a sealed, essentially gas-tight enclosure.

The cylindrical interior of the furnace, arranged along a vertical axis, is divided into two main chambers generally designated 18 and 20, respectively at the upper and lower parts of the structure. While as indicated above, other heating means or other arrangements of electrodes for electrical heating may be used, the upper chamber has vertically spaced sets of electrodes 21, 22, to the terminals of which current (say alternating current of suitable voltage) is applied. Conveniently, for example, each set of electrodes, as at 21, may comprise three electrodes projecting into the chamber, to a point near the center, from equally spaced directions, the arrangement of the other set of electrodes 22 being essentially similar, so that current flows in a vertical direction substantially entirely throughout the charge in the chamber 18, between the sets of electrodes.

The lower chamber 20 is similarly provided with vertically separated sets 23, 24 of like carbon electrodes similarly arranged and energized for heating the carbonaceous material (in which they are embedded) by passage of electric current. Near the foot of the lower chamber 20, chlorine gas is continuously introduced through a suitable port or passage 25, spent gas being withdrawn from the lower chamber through a corresponding passage or duct 26 near the top of this chamber, i. e. above the electrodes. While in some cases the lower chamber may itself comprise vertically arrayed sections of which one is an inorganic, refractory-lined zone having the electrical heating means and the lower part is a carbon-lined zone where the chief chlorination reaction occurs (with advantage in reducing attack on the inorganic or mineral refractory, as described and claimed in the copending application of Elbert F. Hartwick, Serial No. 185,986, filed September 21, 1950), the illustrated structure shows, for the sake of simplicity an essentially single zone 20 lined with the same kind of mineral refractory 12 throughout.

The upper zone 18 is provided near its head, with an exhaust duct or port 28, from which gas may likewise be continuously withdrawn, e. g. being the volatile or other gaseous material driven from the heated charge in the zone 18.

Intermediate the zones 18 and 20, the illustrated furnace includes a lock or appropriate gating means, here comprising a transfer chamber 30, which may be of relatively small vertical extent and which is separated from the upper and lower chambers respectively by gates 31, 32. While any of a variety of gating structures or the like may be used, the drawing shows, for purposes of illustration, an essentially simple arrangement wherein each of the gates 31, 32, is a slab or the like of refractory material arranged to slide horizontally in corresponding grooves 33, 34 of the furnace wall and through respective horizontal slots 35, 36 at one side of such wall. Thus the gates 31, 32 are adapted to be shifted sidewise, i. e. to the right as seen in Fig. 1 from their closed position, to an open position indicated in dot-and-dash lines 31a, 32a, respectively.

Suitable means may be provided for individually shifting each of the horizontal gates in the described manner, e. g. by manual, electrical or fluid power. For example, the gates 31, 32, are shown as respectively connected via piston rods 37, 38, to the pistons 39, 40, of corresponding fluid-pressure operated cylinders 41, 42. For example, each of the cylinders 41, 42 may be of compressed air-actuated type (or in some cases of hydraulic type) of a conventional double-acting nature, so that by appropriate connections and remote control (not shown) the corresponding gate 31 or 32 may be retracted to open position or advanced to closed position, as desired.

Although such may not be necessary in all cases, the intermediate chamber 30 may have its own discharge duct 44, through which gases may, if desired, be withdrawn from the temporarily retained body of carbonaceous material. The operating mechanism for the gates may also be enclosed by a sealed housing 45, e. g. of steel or the like, to prevent any inadvertent escape of chlorine or other gases to the region outside the furnace, especially when the lower gate 32 is open and there may be a little leakage at its slot 36.

It will now be seen that the operation of the described structure, involving performance of the improved method, is essentially simple. Assuming, for instance, that coke is to be treated, the furnace chambers 18 and 20 are first appropriately fill, e. g. to a level 48 in the chamber 18 and to a level 50 in the chamber 20, the gates 31, 32 being closed, and the chamber 30 being empty. Current is supplied to the sets of electrodes for both chambers, raising the temperature in each to the desired value; as will be understood, the initial charge in the lower zone 20 must first be fully heated without benefit of preliminary heating or benefit of the initial treatment; however, since the operation is designed to be continuous over a long period of time, this initial phase is essentially insignificant. As indicated, the temperature in the upper zone 18 is preferably kept at 1000° C. or higher, indeed advantageously, at least for the most part, at 1200° C. or above; at least for reasons of economy, temperatures higher than about 1400° C. are not ordinarily needed or desired in this chamber. In the lower chamber, and while some useful purification can be effected at lower temperatures (e. g. of the order of 1100° to 1200° C.), the temperature is conveniently kept at 1400° C. or higher throughout at least most of the body of carbonaceous material. For example, by controlling the operation so that the temperature within a few inches of the refractory lining 12 is at least about 1400° C., the entire heated charge between the electrodes 23, 24 in the lower chamber will have a corresponding temperature, indeed in considerable part higher, as of the order of 1500° to 1600° C., while the temperature at the inner face, adjacent the wall 12, may be no more than about 1200° C. In accordance with the procedure thus described in the aforesaid copending application Serial No. 185,947, a particularly satisfactory operation is attained, yielding a carbon product having a desirably high purity, while at the same time attack on the refractory wall 12 is not too great.

After the furnace has been in operation for some time, effecting the desired removal of volatile components (e. g. active hydrogen material as described above) from the charge in the chamber 18, the gate 31 is opened to permit a desired quantity of the coke to fall into the intermediate chamber 30; after such operation the gate 31 is promptly reclosed. At the same time, if necessary to afford space in the lower chamber 20, a corresponding amount of purified carbon may have been discharged from the region 15, as by temporarily opening the door 16. The gate 32 is next opened, allowing the hot coke in the chamber 30 to fall into the lower chamber 20, replenishing the charge of the latter, say to the desired level 50. Operation, including continued heating and continuous passage of chlorine into the duct 25, proceeds as before, while gas is continuously withdrawn from the ducts 26 and 28. The gate 32 has also preferably been closed. After a further interval, the described sequence of operations is repeated, advancing a further portion of hot coke from the pretreatment zone 18 through the intermediate chamber 30 to the chlorination zone 20. Correspondingly, from time to time, further quantities of raw coke are introduced to the upper chamber 18 through the feed hopper or gate 14, e. g. to maintain a desired height 48.

In the described fashion, the coke is fed in an at least somewhat continuous manner from the inlet 14 to the discharge means 15, 16 for purified carbon. As the material traverses the preliminary chamber 18, it is heated sufficiently to drive off the active hydrogen material, which is exhausted through the conduit 28. By the locked structure of the central chamber 30, successive portions are transferred to the lower chamber 20, but in every case without an appreciable commingling of the gases present in the respective chambers 18 and 20, such result being promoted, if desired, by exhaust of the central chamber through the port 44. In the lower chamber, the coke is subjected to the desired chlorination treatment, effectively removing the inorganic impurities by conversion to volatile chlorides. Since here the hydrogen or like content of the coke has been reduced, the waste of chlorine by reaction with such material (as described above) is correspondingly less, indeed is preferably eliminated. At the same time, the coke being received there in a highly heated condition, the only additional current necessary between the electrodes 23, 24 is to bring the temperature up from the received value of, say 1200° C. to a desired level, preferably at least about 1400° C. as indicated above.

In the case of anthracite coal, the procedure is essentially the same. Since raw anthracite coal has a relatively high electrical resistance, the furnace may be initially started with charges of coke in both chambers 18 and 20, whereupon anthracite coal is thereafter supplied in successive batches, progressively replacing the coke so that the ensuing run is performed upon the coal as desired. For use with anthracite, the upper chamber 18 may have a suitable height at its region 52 above the uppermost electrodes 21, so that the coal is heated or calcined to a sufficient extent (by transfer of heat from the lower part of the chamber (both directly and by the upwardly passing gases) to bring its electrical conductivity to a suitable value for proper heating effect, the further heating in the main part of the chamber 18 effectuating a still greater reduction in electrical resistance, for the benefit of the additional electric heating necessary in the chamber 20. The downward, continuous or semi-continuous operation with anthracite coal is the same as in the case with coke, successive portions, small relative to the total charge in either of the main chambers, being advanced downward to the transfer chamber 30, in proper synchronism with the introduction of fresh material at the top 14 and removal of purified product at the bottom 15. Similar economy of chlorine is obtained, with anthracite as with coke, and in addition, there is no tendency for the furnace to clog at any point. Specifically, the removal of the active hydrogen material in the upper chamber, there occurring in the absence of the metallic chloride-containing gases, prevents any appreciable reduction of ferric to ferrous chloride in the lower chamber, while the stated absence of ferric chloride in the upper chamber similarly obviates any deposit of ferrous chloride there. In other words, the entire operation is smooth and continuous, without any of the defects or disadvantages heretofore sometimes encountered.

By way of example, such a furnace having an internal chamber of the diameter of three feet, may be continuously operated to deliver 3 to 4 tons of purified carbon, per 24 hour day, from coke or anthracite coal, each of the chambers 18 and 20 having a principal heated zone of a capacity of about 3 tons. It will be understood that the actual proportions of the furnace will depend on the rate of operation and other conditions desired, the structure usually being considerably taller, e. g. in each space between electrodes 21 and 22, or between electrodes 23 and 24, than actually here represented. In each chamber, the average holding time for coke or coal may range from a few hours upwards, satisfactory results, particularly with a moderate rate of flow of chlorine (e. g. 0.3 pound per pound of product in the specific three foot furnace described) having been had with a holding time of the order of 6 to 10 hours, or a total of 12 to 24 hours for the passage of a given batch of coke, say 500 pounds, down the entire shaft. While in some cases, the preliminary treatment in the chamber 18 may need only a shorter time than in the chlorination treatment in the zone 20, convenient operation is had by making these regions more or less equal in size and thus in a continuous run, providing equivalent time of passage in each zone. The purified character of the product derived from the discharge chamber 15, both in the case of coke and anthracite coal, is of the precise nature indicated hereinabove, embodying a very low content of the several impurities, particularly iron, silicon and titanium. As indicated, various types of gate or transfer devices may be employed intermediate the two zones, indeed including supplemental heating means, although such will not usually be found necessary.

By way of further example, Fig. 4 shows an arrangement in which a transversely cylindrical region 30' is provided between the upper and lower zones 18', 20', the main zones thus continuously communicating with the chamber 30' through ports or openings 54, 55, arranged in a horizontally spaced or staggered relation. The cylindrical transfer chamber 30' encloses a screw feeding device 56 carried on a horizontal shaft 57 and arranged to advance the granular coke or coal material from one end of the chamber to the other. A discharge passage 44' is provided, for continuous removal of gas from the chamber 30', supplementing the principal removal of gaseous products from the chlorination chamber 20' which is effected through the discharge duct 26'. By the described operation of the screw feeder 56, the granular carbonaceous material received through the opening 54 from the upper chamber 18' is advanced to the left across the chamber 30' so that it drops through the opening 52 into the lower or chlorination chamber 20'. Although supplemental gates or the like may be provided for the openings 52, 54, this arrangement contemplates that the body of coke or coal contained between the flights of the screw 56 together with the baffle effect of the latter, will prevent appreciable commingling of the gases between the chambers 18' and 20'. The arrangement of Fig. 5 is adapted either for entirely continuous operation, or for semi-continuous process, as by rotating the shaft 57 at times when transfer is desired. In other respects, it will be understood that the arrangement of Fig. 4 is operated, and the process performed, exactly as described above in connection with Figs. 1 to 3.

It will now be seen that the improved procedure and apparatus afford attainment of essentially simple, unitary operation, receiving coke or anthracite coal (or in some cases, even bituminous coals, especially those having characteristics approaching anthracite) and delivering a highly purified carbon product, all with high efficiency and without clogging or other interruption. The consumption of chlorine is greatly reduced, while the utilization of electric power or other source of heat is highly economical.

It is to be understood that the invention is not limited to the specific embodiments herein shown and described, but may be carried out in other ways without departure from its spirit.

We claim:

1. A method of purifying carbonaceous material selected from the class consisting of coke and anthracite coal by chlorination, comprising passing successive quantities of said material in continuous succession through a pretreatment zone while there heating the material to a temperature of at least about 1000° C. to drive off reactive material, and thereafter through a chlorination zone while applying chlorine gas to the material at a temperature of at least about 1400° C., while withdrawing released gaseous materials from both zones and while preventing communication of gas from either zone to the other, said method including advancing successive quantities of the material directly from the first zone to the second while maintaining the material in a heated and confined state, and said passing of successive quantities of the material through the said zones including continuously providing successive quantities of the material simultaneously under treatment in both said zones.

2. A method of purifying carbonaceous material selected from the class consisting of coke and anthracite coal by chlorination, comprising passing successive quantities of said material in continuous succession through a pretreatment zone and a chlorination zone, said method including advancing successive quantities of the material directly from the first zone to the second while maintaining the material in a heated and confined state, heating the material in the first zone to drive off volatile, hydrogen-containing material, passing chlorine gas through the material at elevated temperature in the second zone to convert inorganic contamination to volatilized chloride form, and exhausting gas from both zones, while preventing communication of gas from either zone to the other, said passing of successive quantities of the material through the said zones including continuously providing successive quantities of the material simultaneously under treatment in both said zones.

3. A method as described in claim 2 for purifying anthracite coal having inorganic contamination which includes iron, said treatment in the second zone comprising heating the coal in said chlorine gas to convert said iron contamination to volatilized ferric chloride and said treatment in the first zone comprising heating the coal to a temperature of at least about 1000° C. to drive off volatile reducing material prior to the second zone treatment, for preventing reduction of the aforesaid subsequently produced ferric chloride to ferrous chloride.

4. In a method of purifying coke by treatment with chlorine at an elevated temperature to remove inorganic impurities in gaseous chloride form from said coke, the steps of first heating the coke in the absence of chlorine to drive off reactive hydrogen material, and thereafter transferring the said coke in heated condition to a chlorination zone and there subjecting it to the aforesaid chlorine treatment, while preventing gas communication in either direction between said first heating step and said chlorination zone, said successive steps being effectuated in corresponding zones of which the first is above the second, said coke being passed in continuously successive quantities downward by gravity through the first and second zones in succession.

5. A method of purifying anthracite coal with respect to organic contamination which includes iron, by treating said coal with chlorine at a high temperature to convert the contamination to volatilized chloride material including ferric chloride, comprising passing successive quantities of said coal downwardly by gravity in continuous succession through an upright pretreatment zone and through an upright chlorination zone below the pretreatment zone while providing successive quantities of said coal simultaneously under treatment in both said zones, heating said coal in the first zone in the absence of chlorine to drive off volatile material which is adapted to reduce ferric chloride to ferrous chloride, said coal being advanced in successive quantities from the first zone to the second while maintaining the advanced coal in a heated and confined state, and in the second zone passing chlorine gas through the coal at elevated temperature to convert inorganic contamination to volatilized chloride form, while exhausting gas from both zones and while preventing communication of gas from either zone to the other.

6. A method as described in claim 5 wherein each of said heating and chlorine-treating steps includes applying heat to the coal by passing electric current through it, said first heating step including passing the coal down through a vertically elongated zone while passing said current through the coal in a lower part of said zone and while applying heat to the coal in the upper part of said zone to decrease its electrical resistance, by transfer of heat from said lower part of said zone.

7. A method of purifying coke by chlorination, comprising passing successive quantities of said coke in continuous succession through a pretreatment zone while there heating the coke to a temperature of at least about 1000° C. to drive off reactive material, and thereafter through a chlorination zone while applying chlorine gas to the coke at a temperature of at least about 1400° C., while withdrawing released gaseous materials from both zones and while preventing communication of gas from either zone to the other, said method including advancing successive quantities of the coke directly from the first zone to the second while maintaining the coke in a heated and confined state, and said passing of successive quantities of the coke through the said zones including continuously providing successive quantities of the coke simultaneously under treatment in both said zones.

8. A method of purifying coke by chlorination, comprising passing successive quantities of said coke in continuous succession through a pretreatment zone and a chlorination zone, said method including advancing successive quantities of the coke directly from the first zone to the second while maintaining the coke in a heated and confined state, heating the coke in the first zone to drive off volatile, hydrogen-containing material, passing chlorine gas through the coke at elevated temperature in the second zone to convert inorganic contamination to volatilized, chloride form, and exhausting gas from both zones, while preventing communication of gas from either zone to the other, said passing of successive quantities of the coke through the said zones including continuously providing successive quantities of the coke simultaneously under treatment in both said zones.

9. A method as described in claim 8, wherein each of said zones is a vertically elongated zone, the pretreatment zone being disposed above the chlorination zone and the coke being passed in a downward direction in each zone and being passed directly and immediately in a heated and confined state from the pretreatment zone to the chlorination zone, said pretreatment and chlorination steps each including applying heat to the coke in the corresponding zone by passing electric current through said coke.

References Cited in the file of this patent

UNITED STATES PATENTS

| | | |
|---|---|---|
| 1,032,246 | Smith | July 9, 1912 |
| 1,129,512 | Peacock | Feb. 23, 1915 |
| 1,218,588 | Barnett et al. | Mar. 6, 1917 |
| 1,271,713 | Hutchins | July 9, 1918 |
| 1,277,707 | Dyrssen | Sept. 3, 1918 |
| 1,303,362 | Mott | May 13, 1919 |
| 1,605,098 | Dearborn | Nov. 2, 1926 |
| 1,902,668 | Schwegler | Mar. 21, 1933 |
| 2,149,671 | Franck | Mar. 7, 1939 |
| 2,260,746 | Hannawalt et al. | Oct. 28, 1941 |
| 2,315,346 | Mitchell | Mar. 30, 1943 |

FOREIGN PATENTS

| | | |
|---|---|---|
| 453,072 | Great Britain | Sept. 4, 1936 |
| 957,912 | France | Feb. 28, 1950 |